United States Patent [19]
Bartlett et al.

[11] 4,126,038
[45] Nov. 21, 1978

[54] TESTING APPARATUS FOR HYDRAULIC CIRCUITS

[75] Inventors: Harold H. Bartlett, Peoria, Ill.; Rodney L. Bussell, Bettendorf, Iowa; Robert E. Coats, Peoria, Ill.

[73] Assignee: Caterpillar Tractor Co., Peoria, Ill.

[21] Appl. No.: 846,948

[22] Filed: Oct. 31, 1977

[51] Int. Cl.² ............................................. G01M 17/00
[52] U.S. Cl. .......................................... 73/118; 73/168
[58] Field of Search ........................ 73/168, 61.4, 118; 137/555; 235/92 PC; 324/71 CP

[56] References Cited
U.S. PATENT DOCUMENTS

| 3,748,898 | 7/1973 | Menibus | 73/168 |
| 3,952,580 | 4/1976 | Bennett | 324/71 CP X |

*Primary Examiner*—Jerry W. Myracle

*Attorney, Agent, or Firm*—Wegner, Stellman, McCord, Wiles & Wood

[57] ABSTRACT

A testing apparatus for testing the hydraulic circuits of a vehicle having at least two independent hydraulic circuits including a plurality of supplies conduits, one for each independent hydraulic circuit for receiving hydraulic fluid from the associated circuit, couplings on the supply conduits for coupling each supply conduit to an associated circuit, a return for returning hydraulic fluid to the circuits, a single particle sensor adapted to receive hydraulic fluid and provide an output signal indicative of particle contaminants in the hydraulic fluid, the return being connected to the sensor and a valve for selectively connecting any desired one of the supply conduits to the sensor and disconnecting the remainder of the supply conduits from the sensor so that contamination in any of the independent circuits may be determined with a single sensor.

4 Claims, 3 Drawing Figures

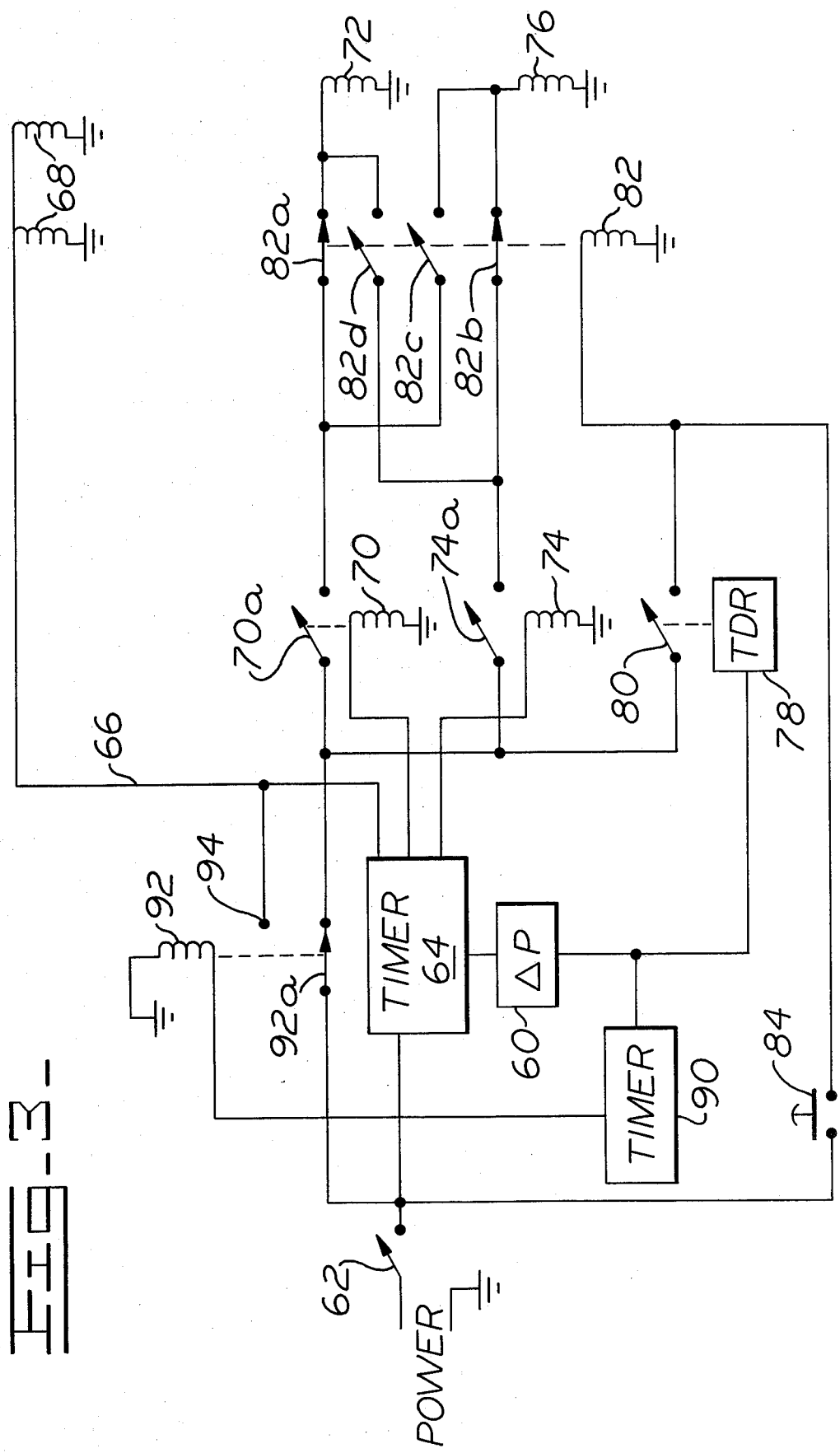

TESTING APPARATUS FOR HYDRAULIC CIRCUITS

BACKGROUND OF THE INVENTION

This invention relates to testing apparatus for testing the hydraulic circuits of a vehicle having at least two independent hydraulic circuits.

Manufacturers of various apparatus find it highly desirable to test their products before they are shipped to ensure that the ultimate purchaser will receive an apparatus that is in good working order. Of course, the more complex the apparatus, the more complex the testing procedure must be to ensure that the results obtained from testing are accurate and that a defective apparatus will not be shipped inadvertently. Thus, as complexity of the testing procedure increases, the cost of the same increased and there is an increased possibility that part of the test will not be performed and/or recorded properly.

In some cases, similar tests must be performed on similar, but independent, parts of an apparatus. This has resulted in utilization of a single piece of testing equipment to perform the similar tests, in some desired sequence, with the consequence that some of the tests of the apparatus part may be overlooked and/or test results of one part influenced by test results of another part performed on the same testing equipment.

And, while such difficulties are not unique to the testing of any particular type of apparatus, in the case of complex machinery such as vehicles of the type employing plural, independent hydraulic circuits such as a hydrostatic drive circuit and an independent implement circuit for a work performing means such as a bucket, backhoe, or the like, it is imperative that the tests be performed and the results recorded reliably to ensure that the vehicle does not reach the ultimate purchaser in a defective condition.

SUMMARY OF THE INVENTION

The present invention is directed to overcoming one or more of the above problems.

According to the present invention, there is provided a testing apparatus for testing the hydraulic circuits of a vehicle having at least two independent hydraulic circuits including a plurality of supply conduits, one for each independent hydraulic circuit, for receiving hydraulic fluid from the associated circuit. Coupling means are disposed in the supply conduits for coupling each supply conduit to an associated circuit on the vehicle and return means are provided for returning hydraulic fluid to the circuits. A single particle sensor is adapted to receive hydraulic fluid and provide an output signal indicative of particle contaminants in the hydraulic fluid. The return means is connected to the sensor and means are provided for selectively connecting any desired one of the supply conduits to the sensor and disconnecting the remainder of the supply conduits from the sensor whereby contamination in any of the independent circuits may be determined with a single sensor.

Other objects and advantages will become apparent from the following specification taken in connection with the accompanying drawings.

DESCRIPTION OF THE DRAWINGS

FIG. 3 is a schematic of a control for the testing apparatus.

DESCRIPTION OF THE PREFERRED EMBODIMENT

Figure 1:
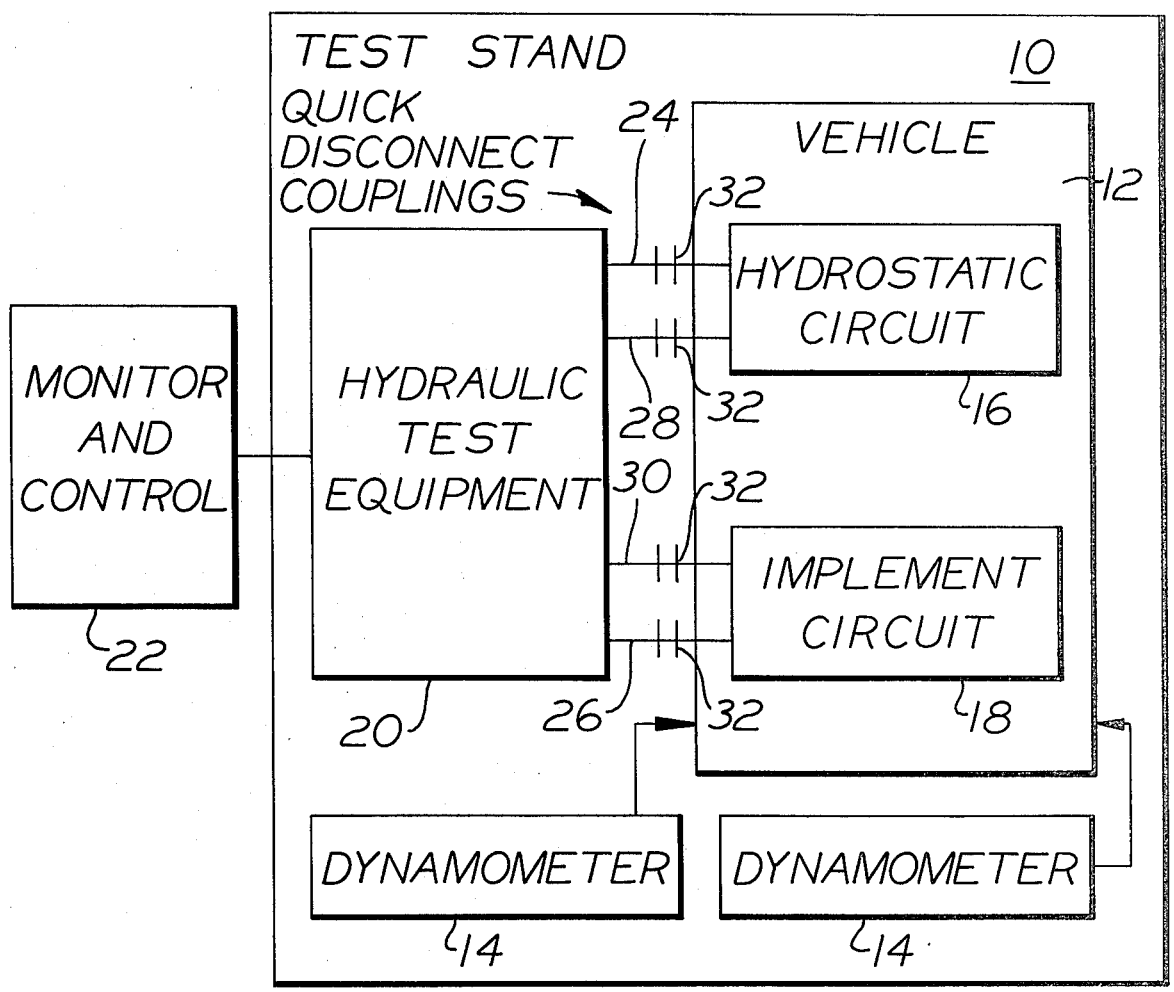
FIG. 1 is a schematic plan view of a test stand for a vehicle embodying a testing apparatus made according to the invention.

An exemplary embodiment of adjusting apparatus made according to the invention is intended to be used with a test stand for vehicles of the type disclosed in the commonly assigned copending application of Bartlett et al, Ser. No. 763,315, now U.S. Pat. No. 4,062,234, entitled "Testing Apparatus", filed Jan. 28, 1977; and such a test stand is shown somewhat schematically in FIG. 1.

The stand includes a test area 10 including mounting means (not shown) for mounting a vehicle 12 in the test area. The vehicle typically has opposed motive outputs which are adapted to be coupled to dynamometers 14. The testing apparatus of the present invention is adapted to be used when the vehicle 12 is of the type having a plurality of independent hydraulic circuits. For example, the vehicle may have a hydrostatic drive circuit 16 driven by an engine (not shown) which, in turn, provides power to the motive outputs to which the dynamometers 14 are coupled.

The vehicle will also have an implement circuit 18 driven by the engine. Depending upon the type of vehicle, the implement circuit may include hydraulic cylinders for elevating lift arms in a front end loader, cylinders for moving the boom and stick and bucket of a backhoe, etc.

The testing apparatus of the present invention is disposed adjacent the test area and is designated 20. The same provides an output to a monitor and control 22 which may include recording equipment to record test results. To provide information to the test equipment 20, there are provided a plurality of supply conduits 24 and 26, one for each of the independent hydraulic circuits 16 and 18 along with a plurality of return conduits 28 and 30, again, one for each of the independent circuits 16 and 18.

The conduits 24 and 28 are adapted to be associated with the circuit 16, while the conduits 26 and 30 are adapted to be associated with the circuit 18 and typically will be flexible. At their ends, they will mount quick-disconnect couplings 32 which can be suitably secured to any desired part of the circuits 16 and 18 on the vehicle 12.

In the usual case, the conduits 24–30 may have a fair degree of length on the order of several feet.

Figure 2:
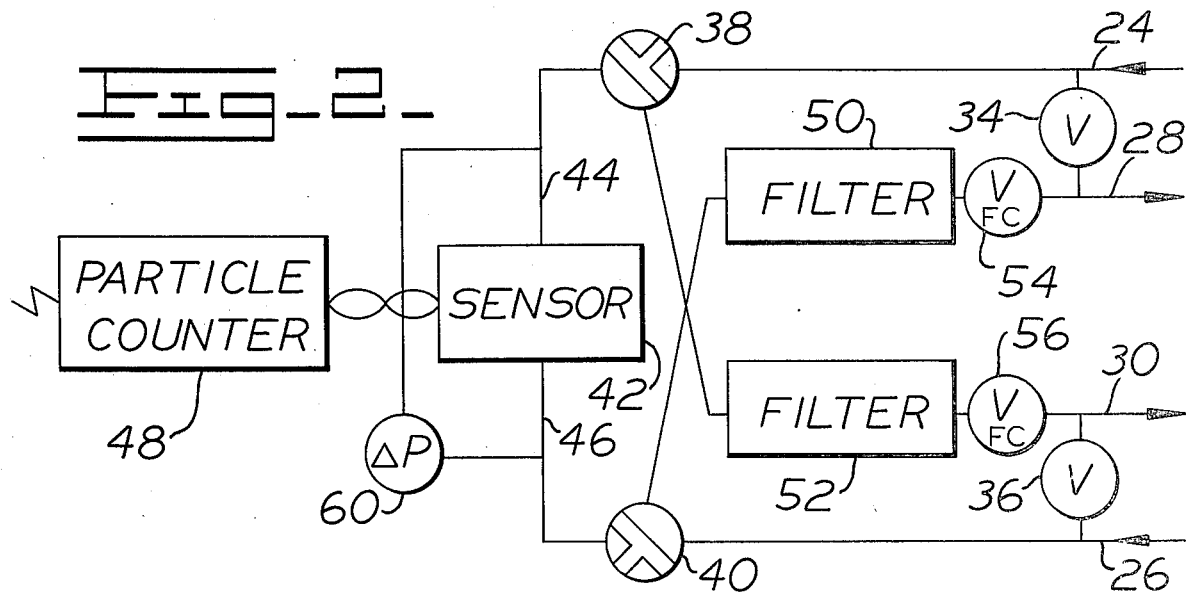
FIG. 2 is a hydraulic schematic of testing apparatus made according to the invention.

As seen in FIG. 2, each supply conduit 24 and 26 and its associated return conduit 28 and 30, respectively, are interconnected by a selectively operated bypass valve 34 and 36. The supply conduits 24 and 26 also extend to three-way valves 38 and 40 which, in turn, are connected to a particle sensor 42 of conventional construction. The particle sensor includes a pair of ports 44 and 46 which are interconnected by a fluid flow path, as is well known, and hydraulic fluid flowing through such a fluid flowpath is monitored with the sensor 42 providing an output to a particle counter 48, also of conventional construction which, in turn, indicates the degree of contamination, if any, of the hydraulic fluid. The particle counter 48 may be connected to the monitor and control 22 so as to enable a permanent recording of the test results.

The three-way valve 38 is connected to a filter 50 while the valve 40 is connected to a filter 52. The filters 50 and 52 are, in turn, in series with conventional flow rate control valves 54 and 56 which are then connected to the junction of the bypass valves 34 and 36 and the return conduits 28 and 30, respectively.

When the bypass valves 34 and 36 are closed, the valves 38 and 40 may be operated in such a way as to connect the supply conduit 24 to the port 44 of the sensor 42 and the port 46 to the return line 28. Conversely, the valves 38 and 40 may be operated to connect the supply conduit 26 to the port 46 and the port 44 to the return line 30.

Thus, bidirectional flow may be established through the sensor 42 depending upon the orientation of the valves 38 and 40 with the flow rate being controlled by respective ones of the flow control valves 54 and 56. Fluid within the lines is filtered by the filters 50 and 52 before being returned to the corresponding circuit.

The sensor 42 is provided with a pressure sensor 60 connected across the ports 44 and 46. When the pressure sensor 60 determines that a considerable pressure differential exists across the sensor 42, the same provides an output indicative of that fact which is taken as a measure of clogging of the sensor 42 by particles within the hydraulic fluid. In this connection, it will be appreciated that since flow through the sensor 42 is bidirectional, depending upon whether it is receiving pressurized fluid from the supply conduit 24 or the supply conduit 26, the system tends to unclog itself.

To ensure tht obtained test results are reliable and to minimize system reliance upon the human element, a control for the same is provided and is illustrated in FIG. 3, which will be described in connection with the intended steps of operation of the testing apparatus.

The control circuit includes an off-on switch 62 which may be closed when a test cycle is to be initiated and after the couplings 32 have been affixed to the circuits 16 and 18. As a consequence, a timer 64 is energized and the same immediately provides power on a line 66 to energize solenoid 68 which, in turn, opens both of the bypass valves 34 and 36. As a consequence, hydraulic fluid in both of the lines 24 and 26 will be returned to the vehicle via the return lines 28 and 30 thereby flushing the lines 24 and 26 of any hydraulic fluid remaining therein from the circuits of a vehicle previously being tested. To maximize the efficiency of the flushing operation, it is preferred that the bypass valves 34 and 36 be in extremely close proximity, in the fluid flow sense, to the sensor and the valves 38 and 40 and remote as possible from the couplings 32. In this way, only a small amount of fluid from the previous vehicle being tested will remain in the system. As soon as a sufficient time has passed so as to enable complete flushing of the lines, the timer 64 will remove power from the line 66 and apply power to a relay 70 which closes normally open contacts 70a to apply power to a solenoid 72 which drives the valve 38 to a position coupling the conduit 24 to the port 44. In the usual case, the valve 40 will be provided with a spring return which will automatically cause the same to assume a condition coupling the port 46 to the return line 28. As a consequence, fluid will flow from the circuit 16 through the sensor to be tested.

After a sufficient time period has elapsed, the timer will remove power from the relay 70, thereby de-energizing the solenoid 72 and allowing the valve 38 to return, under spring influence, to a condition whereat it interconnects the port 44 to the return line 30. The timer 64 will then energize a relay 74 which closes normally open contacts 74a to apply power to a solenoid 76 which drives the valve 40 to a position connecting the supply conduit 26 to the port 46. The relay 74 will remain energized until sufficient time has elapsed to determine contamination, if any, in the implement circuit 18.

The timer 64 is operative to provide power whenever the switch 62 is closed to the pressure sensor 60. So long as the pressure sensor 60 does not detect a pressure differential indicating clogging nothing will occur. However, when a pressure differential indicating clogging exists, the pressure sensor 60 will provide a signal energizing a time delay relay 78 which then closes normally open contacts 80, connected to power to energize a relay 82.

Energization of the relay 82 results in the opening of normally closed contacts 82a and 82b on the input side of the valve solenoids 72 and 76, respectively, while closing normally open contacts 82c and 82d which cross-connect the relay contact 74a and the solenoid 72 and the relay contact 70a and the solenoid 76, respectively.

Of course, once the time delay relay 78 has timed out, the contacts 80 open, thereby de-energizing the relay 82. The purpose of this construction is as follows.

If a pressure differential is sensed indicating clogging, whichever one of the valve solenoids 72 and 76 is then energized will be de-energized by the opening of contacts 82a and 82b and the other of the solenoids 72 and 76 will be energized by reason of the closing of the contacts 82c and 82d. As a result, there will be an immediate reversal of flow through the sensor for the period of time set on the time delay relay 78 to eliminate clogging.

If desired, a manually operable switch 84 may be disposed in parallel with the contacts 80 so as to allow manual flow reversal by the same means should the system not respond to unclogging through a single reversal of flow caused by the time relay 78.

An auxiliary timer 90 also receives a signal from the pressure sensor 60. If the sensor detects a pressure differential for longer than a predetermined time, indicating that the particle sensor 42 is hopelessly clogged, at the end of that time period, the timer 90 will energize a relay 92 to open normally closed contacts 92a thereof. The opening of the contacts 92a will result in the removal of power from the input sides of each of the contacts 70a, 74a and 80, thereby de-energizing both of the valve solenoids 72 and 76. If desired, when the contacts 92a move from their normally closed state, they may be made to close through contact 94 to re-energize the bypass valve solenoid 68.

From the foregoing, it will be appreciated that a testing apparatus made according to the invention enables a plurality of independent hydraulic circuits to be tested with but a single sensor, thereby minimizing the amount of test equipment required. It will also be appreciated that the control for the system ensures that all tests will be performed and provides the means whereby the results can be recorded. The system also lends itself to testing on an assembly line basis without fear that the results of a prior test influence a subsequent test by provision of the bypass valves and the automatic sequencing thereof.

The embodiments of the invention in which an exclusive property or privilege is claimed are defined as follows:

1. A testing apparatus for testing the hydraulic circuits of a vehicle having at least two independent hydraulic circuits, comprising:

a plurality of supply conduits, one for each independent hydraulic circuit, for receiving hydraulic fluid from the associated circuit;

coupling means on said supply conduits for coupling each supply conduit to an associated circuit;

return means for returning hydraulic fluid to said circuits;

a single particle sensor adapted to receive hydraulic fluid and provide an output signal indicative of particle contaminants of the hydraulic fluid, said return means being connected to said sensor;

means for selectively connecting any desired one of said supply conduits from said sensor;

a plurality of return conduits, one for each independent hydraulic circuit;

coupling means on each of said return conduits for coupling each return conduit for an associated circuit;

said selective connecting means being operative to connect the one of said return conduits associated with a selected supply conduit to said sensor while disconnecting the remainder of said return conduits from said sensor, said selective connecting means comprising valve means in close fluid flow proximity to said sensor and remote from said coupling means, and bypass valves in close fluid flow proximity to said valve means for selectively interconnecting each supply conduit with the associated return conduit.

2. The testing apparatus of claim 1 further including control means for said valve means for causing sequential connection of each of said supply and associated return conduits to said sensor and to provide a testing cycle and means for operating said bypass valves at the beginning of each testing cycle while precluding the flow of hydraulic fluid to said sensor.

3. In a testing apparatus for testing the hydraulic circuits of a vehicle having at least two independent hydraulic circuits, the combination of:

a plurality of supply conduits, one for each independent hydraulic circuit, for receiving hydraulic fluid from the associated circuit;

coupling means on said supply conduits for coupling each supply conduit to an associated circuit;

return means for returning hydraulic fluid to said circuits;

a single particle sensor adapted to receive hydraulic fluid and provide an output signal indicative of particle contamination of the hydraulic fluid;

said return means being connected to said sensor;

valve means in close proximity to said sensor for selectively connecting any desired one of said supply conduits to said sensor and disconnecting the remainder of said supply conduits from said sensor;

bypass means interconnecting each of said supply conduits with said return means, said bypass means being connected to said supply conduits in close proximity to said valve means and remote from said coupling means; and means for selectively operating said bypass means so that said supply conduits may be substantially entirely flushed after each use thereof.

4. In a testing apparatus for testing the hydraulic circuits of a vehicle having at least two independent hydraulic circuits, the combination of:

a plurality of supply conduits, one for each independent hydraulic circuit, for receiving hydraulic fluid from the associated circuit;

return conduits, one for each circuit, for returning hydraulic fluid to an associated circuit;

coupling means on said conduits for coupling one supply and one return conduit to each circuit;

a single particle sensor having two fluid ports with an interconnecting flow path for providing an output signal indicative of particle contamination of hydraulic fluid in said flow path;

means for selectively connecting any desired one of said supply conduits and the associated return conduit to said sensor while disconnecting the remainder of said supply and return conduits therefrom such that one of said supply conduits may be connected to the other of said ports to provide bidirectional flow of fluid through said flow path to relieve clogging thereof; and bypass valves for interconnecting each supply and associated return conduit in close proximity to said sensor.

* * * * *